US010402381B2

(12) United States Patent
Horvatin et al.

(10) Patent No.: US 10,402,381 B2
(45) Date of Patent: Sep. 3, 2019

(54) DETERMINE CONFIDENCE OF MAIL ARCHIVE OWNERSHIP FROM SENDERS IN "SENT ITEMS" FOLDER (71) Applicant: QUEST SOFTWARE INC., Aliso Viejo, CA (US)

(72) Inventors: Kevin Anthony Horvatin, Waunakee, WI (US); Steven Allen Moore, Verona, WI (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 424 days.

(21) Appl. No.: 14/731,283

(22) Filed: Jun. 4, 2015

(65) Prior Publication Data
US 2016/0357735 A1 Dec. 8, 2016

(51) Int. Cl.
*G06F 16/21* (2019.01)
*H04L 12/58* (2006.01)

(52) U.S. Cl.
CPC ............ *G06F 16/214* (2019.01); *H04L 51/22* (2013.01)

(58) Field of Classification Search
CPC ....... G06F 17/303; G06F 16/214; H04L 51/22
See application file for complete search history.

(56) References Cited

U.S. PATENT DOCUMENTS

| 7,047,212 B1 | 5/2006 | Pych et al. |
| 7,590,696 B1 | 9/2009 | Odell et al. |
| 7,725,544 B2 * | 5/2010 | Alspector ............ G06Q 10/107 709/206 |
| 7,921,292 B1 | 4/2011 | Pauker et al. |
| 9,305,289 B2 | 4/2016 | Roic et al. |
| 9,619,556 B1 * | 4/2017 | Ilkal ........................ H04L 51/22 |
| 2003/0084301 A1 * | 5/2003 | Krawetz ............. H04L 63/0435 713/184 |
| 2003/0233419 A1 * | 12/2003 | Beringer ............... G06Q 10/107 709/206 |
| 2004/0243679 A1 | 12/2004 | Tyler |
| 2005/0050547 A1 | 3/2005 | Whittle et al. |
| 2006/0045124 A1 | 3/2006 | Dahlstrom et al. |
| 2006/0168049 A1 | 7/2006 | Orozco et al. |
| 2006/0242109 A1 | 10/2006 | Pereira et al. |

(Continued)

OTHER PUBLICATIONS

Nir Sofer; NK2Edit v1.10, Jun. 17, 2010, NirSoft, https://web.archive.org/web/20100617161401/http://www.nirsoft.net/utils/outlook_nk2_edit.htm land https://web.archive.org/web/20100617161401/http://www.nirsoft.net/utils/nk2edit_menus.html, pp. 1-6.

(Continued)

*Primary Examiner* — Jorge A Casanova
(74) *Attorney, Agent, or Firm* — Maschoff Brennan (57) ABSTRACT

A method for determining mail archive ownership during data migration is described. The method is performed by a Migration Manager that is capable of generating a list of possible owners based on confidence level. The confidence level is obtained by scanning various messages associated with the mail archive and determining a frequency of appearance a particular user name (e.g., e-mail address) appears compared to the total number of messages scanned. The generated list of possible owners can subsequently be used to determine/confirm the owner of the mail archive. Confirmation may be required before the data migration is completed.

11 Claims, 3 Drawing Sheets

(56) References Cited

U.S. PATENT DOCUMENTS

| | | | |
|---|---|---|---|
| 2007/0016643 A1 | 1/2007 | Boss et al. | |
| 2008/0005355 A1 | 1/2008 | Craft et al. | |
| 2008/0278740 A1 | 11/2008 | Bird et al. | |
| 2009/0159509 A1 | 6/2009 | Wojdyla et al. | |
| 2010/0169264 A1 | 7/2010 | O'Sullivan et al. | |
| 2010/0250682 A1 | 9/2010 | Goldberg et al. | |
| 2011/0055264 A1* | 3/2011 | Sundelin | G06Q 10/107 707/776 |
| 2011/0218845 A1 | 9/2011 | Medina | |
| 2012/0185926 A1* | 7/2012 | Topatan | H04L 51/22 726/7 |
| 2013/0212200 A1* | 8/2013 | Dennis | H04L 51/22 709/206 |
| 2014/0089235 A1 | 3/2014 | Lynar et al. | |
| 2015/0106490 A1 | 4/2015 | Floyd et al. | |
| 2015/0134749 A1* | 5/2015 | Bhamidipaty | G06Q 10/107 709/206 |
| 2016/0328097 A1* | 11/2016 | Ganin | G06F 3/0482 |
| 2016/0344672 A1 | 11/2016 | Brisebois | |
| 2016/0357438 A1 | 12/2016 | Horvatin | |

OTHER PUBLICATIONS

Wiseman, Steve; Backup and Restore Outlook 2003 Auto Complete Data, Sep. 4, 2007, IntelliAdmin, http://www.intelliadmin.com/index.php/2007/09/backup-and-restore-outlook-2003-auto-complete-data/, pp. 1-7.
U.S. Appl. No. 14/719,121 Office Action dated Jun. 30, 2017.
U.S. Appl. No. 14/731,278 Office Action dated Jul. 14, 2017.
U.S. Appl. No. 14/719,121, Michael A. Brisebois, Method for Determining Predictive Response Time Across Enterprise Communication Systems, filed May 21, 2015.
U.S. Appl. No. 14/731,278, Kevin A. Horvatin, Migrate Nickname Cache for Email Systems and Devices, filed Jun. 4, 2015.

* cited by examiner

DETERMINE CONFIDENCE OF MAIL ARCHIVE OWNERSHIP FROM SENDERS IN "SENT ITEMS" FOLDER

BACKGROUND OF THE INVENTION

Field of Invention

The present invention generally relates to data migration. More specifically, the present invention relates to determining mail archive ownership.

Description of the Related Art

Data migration can be viewed as a process for transferring data between one or more computer systems and storage devices. Data migration may be performed for several reasons including providing backup copy of the data and consolidating data over different systems and devices into one central location. Data migration may also be performed to provide information from one computer system to a new computer system so that the new computer system also has access to the migrated data.

Generally, data migration is performed through the use of a processor and corresponding data migration software run on the processor. The data migration software allows the data migration to be performed in an automated fashion. To achieve an effective data migration, the data migration software also maps between locations where the data is originally stored (e.g., a source system) and where the data will be written (e.g., a target system). The data migration software further evaluates the format of the data being extracted from its original storage location (e.g., the source system) and a requested format of the data corresponding to the location where the data will be written to (e.g., the target system).

One type of data that may be migrated are personal storage table (PST) data. PSTs correspond to an archived version of electronic mail (e-mail) that is stored locally on a user computing device (e.g., laptop, desktop). With the computing device, ownership of the PST may be clear. For example, the PST data on the computing device may be labeled with the owner of the computing device or associated with a particular mailbox. There may be situations where this PST data may be migrated from one location (e.g., source system) to a new location (e.g., target system). For example, the owner would like to have access to the emails stored in one computing device on other computing devices.

There may be situations, however, where the chain of ownership for the PST data may not be clear or may be lost during data migration. In one situation, it is possible that ownership of the PST data can be modified during data migration. For example, an administrator (an individual other than the original owner of the PST data) can become the current owner of the archived data when the PST data is stored (temporarily or long term) in a device (e.g., storage device, computing device) associated with the administrator. Given that a plurality of the PST data can be migrated and stored within the same space (e.g., storage device), differentiating which PST belong to which original owner may be difficult.

It is desired that a method for determining who the original owner for a particular PST data be provided. The PST data, although temporarily controlled by an administrator, may be migrated to another device associated with the original owner. As noted above, the user (e.g., original owner) may wish to migrate PST data associated with one email account on one device to a different email account on a different device. Therefore, determining who the owner is of the PST may be necessary to ensure that the correct PST data is provided to the correct owner on the new device through the use of data migration.

SUMMARY OF THE CLAIMED INVENTION

A method for determining mail archive ownership via a Migration Manager is claimed. The method first includes the step of scanning a plurality of archived messages associated with the mail archive. The scanning obtains a list of possible owners with each unique user name detected during the scanning. A confidence level can then be calculated for each user name based on a frequency of appearance a particular name appears in the scanned messages. Ownership can then be confirmed based on a generated list of possible owners based on the calculated confidence level. Once ownership is confirmed for the mail archive, the Migration Manager can complete the data migration of the mail archive to the target source associated with the owner.

A system for determining mail archive ownership via a Migration Manager is also claimed. The Migration Manager may first scan a plurality of archived messages associated with the mail archive. The scanning obtains a list of possible owners with each unique user name detected during the scanning. A confidence level can then be calculated for each user name based on a frequency of appearance a particular name appears in the scanned messages. Ownership can then be confirmed based on a generated list of possible owners based on the calculated confidence level. Once ownership is confirmed for the mail archive, the Migration Manager can complete the data migration of the mail archive to the target source associated with the owner.

DETAILED DESCRIPTION

The systems and methods described herein are directed towards data migration over a network. More specifically, the systems and methods are directed towards a Migration Manager that is capable of determining ownership of a particular set of archived mail (e.g. PST data). In some cases, ownership of the archived mail data (e.g., PST data) may not be obvious. For example, ownership information may be modified since the archived mail data was extracted from its original location. Determination of the appropriate ownership for each corresponding archived mail data is necessary in order to properly migrate the stored archived mail from one source device to the appropriate mailbox on the target device. By looking at different aspects of the archived mail data (e.g., messages in the "Sent Items" folder), the Migration Manager can infer who the owner is with a particular level of confidence. Confirmation may be required at the target destination in order to ensure that the determined owner is in fact the actual owner of the archived mail before the data migration is completed.

Figure 1:
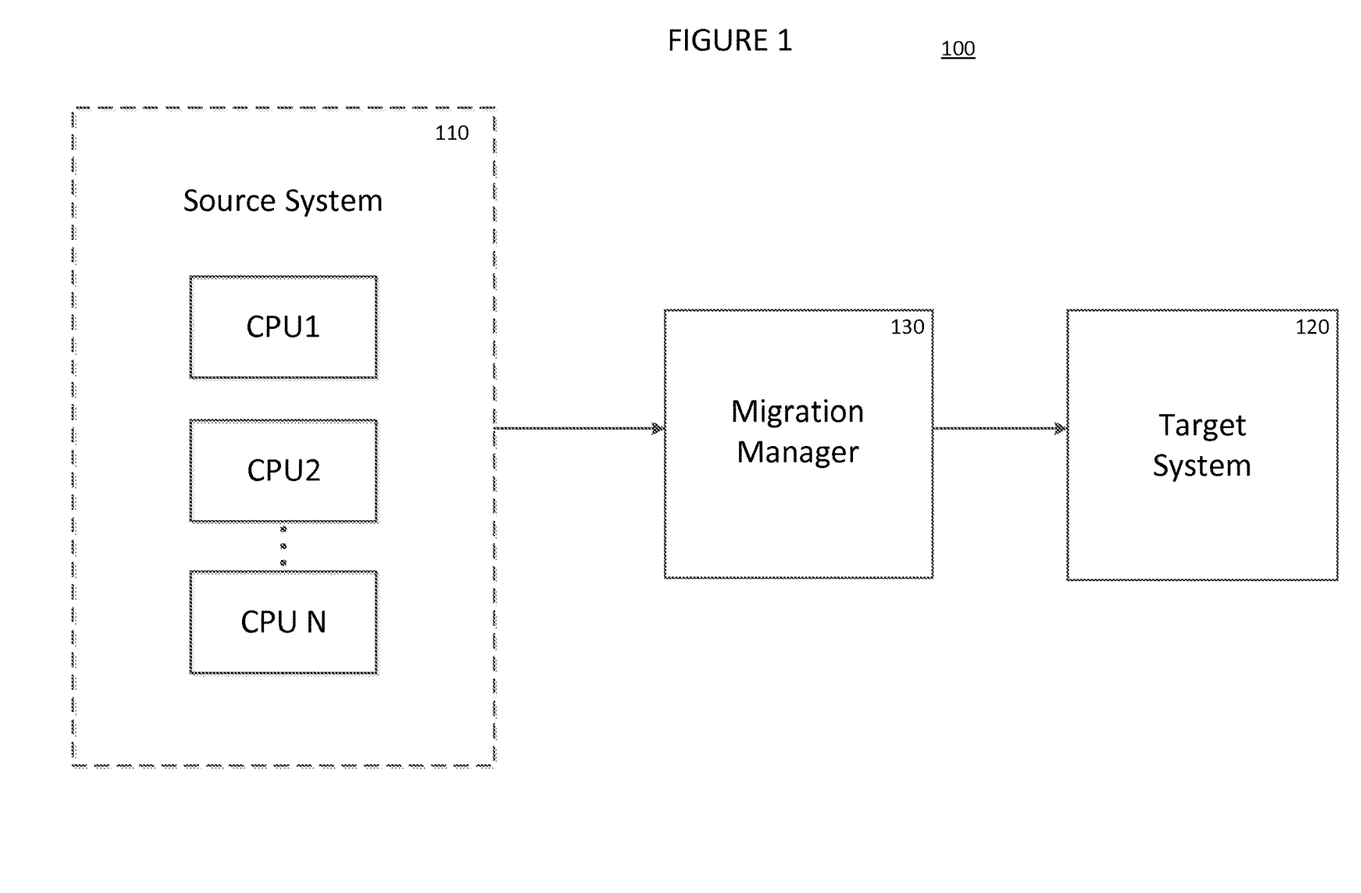
FIG. 1 illustrates a system for data migration between various computing devices and storage using the Migration Manager.

FIG. 1 illustrates a system 100 for data migration between a source system 110 and a target system 120. The source system 110 may include one or more sources such as computing devices (e.g., laptop, desktop, mobile device). The source system 110 may have various types of data stored locally in memory associated with each computing device. For example, the data (e.g., PST data) may be associated with an application (e.g., e-mail) stored on the computing device. The data stored in the source system 110 can be selected for migration from the source system 110 to the target system 120. In some cases, the data migration may occur at a pre-scheduled day and time to ensure that the data is available and not in use (e.g. after business hours).

The target system 120 may be a storage device or a server. The target system 120 can be used to store the data being migrated from the source system 110. Data migration may be performed for a variety of reasons. In some cases, data from the source system 110 may be stored on the target system 120 in order to provide a back-up copy of the data. The data can also be stored on the target system 120 in order to have all of a particular set of data in one common location.

In some embodiments, the target system 120 can also be another computing device. For example, a user may wish to migrate data stored in one computing device to another computing device (e.g., the target system 120). In this way, the data that was migration can also be used with the other computing device that was the target of the data migration. A user may wish, for example, that the archived mail stored in the first computing device be migrated to a second device. The data migration may also transfer archived mail between different types of devices, applications, and formats.

The system 100 performs the data migration between the source system 110 and the target system 120 by using a Migration Manager 130. As described herein, the Migration Manager can be viewed as a collection of different functionalities that all facilitate data migration. The Migration Manager 130 may be implemented as a computing device that includes its own processor and memory. The Migration Manager 130 can carry out scheduled data migrations based on instructions stored in memory of the Migration Manager 130. These instructions may include identifying the data to be migrated, from which sources the data is to be migrated, and the time when the data migration is to occur. In other embodiments, an administrator (e.g., an individual responsible for managing and operating the Migration Manager 130) may customize the characteristics of a data migration being carried out by the Migration Manager 130. In other words, the administrator is capable of inputting information identifying the data to be migrated, where the data may be located, and when the data migration should be performed. Further details for the various features and functionalities of the Migration Manager 130 are provided below.

As noted above, scheduling data migration may be customized to ensure that a particular source in the source system and/or data to be extracted is not being currently being used. For example, the scheduling may be structured after work hours when the source system and/or data are less likely to be in use. In some situations, an administrator in charge of the data migration may request from various users a period of time to perform data migration where one or more source systems and/or data will not be in use. By ensuring that either the source system and/or data are not being used during the performance of the data migration, the Migration Manager (or administrator) can lessen the likelihood that the data during migration becomes corrupted. In some cases, if the source system and/or data are in use, data migration for that particular source system and/or data may not be possible. The Migration Manager may then be instructed to reschedule the data migration for a different period of time whereby the source system and/or data is not in use.

The Migration Manager may also be capable of rescheduling a data migration for other reasons as well. For example, a network used to carry out the scheduled data migration may be down or performing at a sub-par level (e.g., network is busy with other concurrent processes). The Migration Manager may be capable of evaluating the network performance in order to determine if it would be appropriate to continue with the scheduled data migration or reschedule it for a later time when the network performance may be improved (e.g., the network is fixed).

It should be noted that data migration may be performed with numerous different users simultaneously. The Migration Manager can obtain information from the various different users for available periods of time when data migration can be performed. The Migration Manager can schedule groups of users based on similar periods of time where data migration may be performed. It can be difficult for an administrator to manually communicate with and determine when each individual user is available and subsequently instruct the Migration Manager to perform the data migration that satisfies the time constraints for all the users in question. The Migration Manager can be instructed to obtain this information from the user in an automated fashion and subsequently schedule the data migrations based on the responses from the various users.

Figure 2:
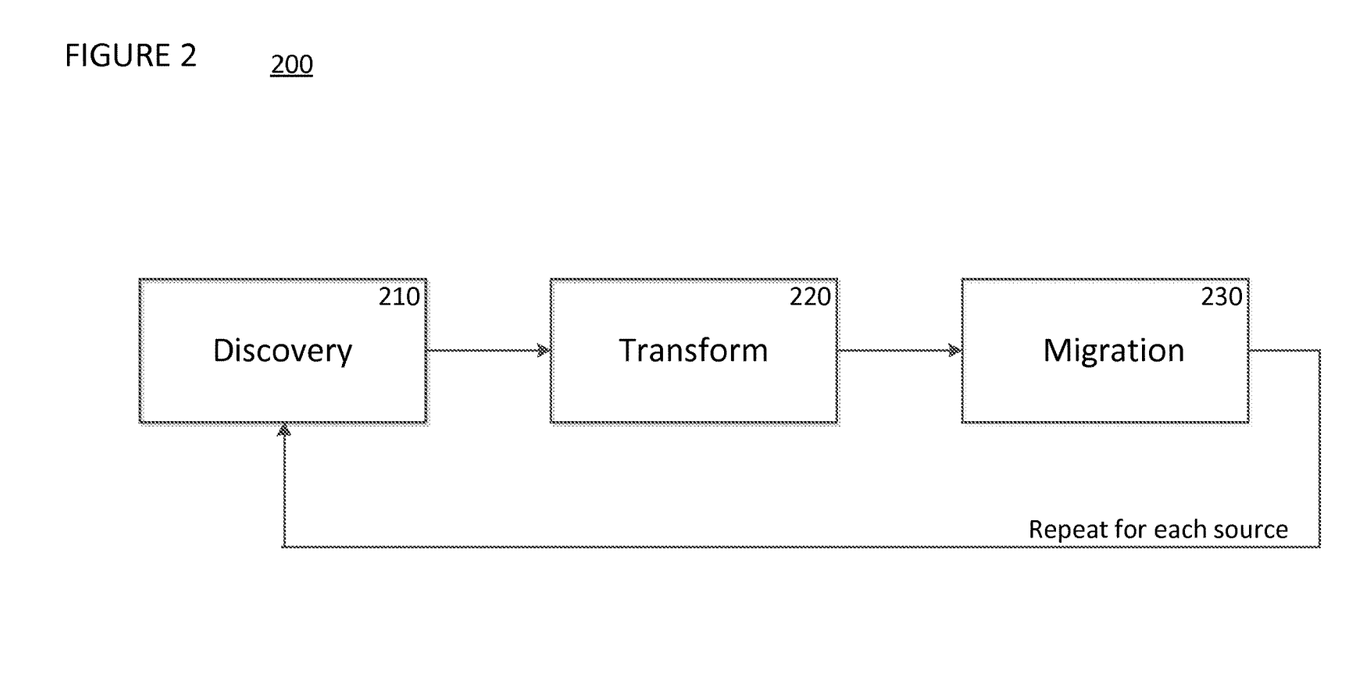
FIG. 2 illustrates a flowchart describing steps performed during data migration.

FIG. 2 illustrates a flowchart 200 describing exemplary steps performed during data migration. As noted above, data migration between the source system and the target system is performed by the Migration Manager.

Generally, the Migration Manager performs steps that fall under three broad classifications. First, the Migration Manager is instructed to discover the sets of data from one or more source systems to be migrated in step 210. This may include determining what data needs to be migrated and where the data is stored. The Migration Manager may be informed about such details (e.g., administrator identifies particular sets of data or users to migrate data from, the user identifies to the Migration Manager what data should be migrated). Second, the Migration Manager provides transformations. In particular, the transformations are used to format the data extracted from the source system to fit the format of the target system in step 220. Third, the Migration Manager extracts and subsequently writes the source data into the target system in step 230. The Migration Manager, during the data migration, may use any applicable transformation derived in step 220.

It should be noted that the flowchart 200 illustrates one embodiment of the present invention. Within each step 210-230, there may be additional steps as described herein.

With respect to step 210, the Migration Manager may be instructed to locate a particular set of data stored in one or more source systems to be migrated to the target system. As indicated above, the Migration Manager may be provided information identifying what data is to be migrated and where the data might be found (e.g., user names and corresponding computing devices). The Migration Manager can then perform searches of all possible locations in the source system for the specified data to be migrated.

For example, data migrations may be directed towards migrating PSTs (i.e. personal storage tables). Generally, PSTs correspond to a file format (.pst) associated with Microsoft software (e.g., Microsoft Exchange Client, Windows Messaging, and Microsoft Outlook). The PSTs are used to store and archive copies of data (e.g., messages, calendar events) locally on a computer from which a user is utilizing the associated Microsoft software. The user may be able to identify the PST data and inform the Migration Manager that the PST data should be migrated to a target system. As described above, the user may desire migrating the data so the user has access to the same archived data on the target system.

In a possible scenario, a business may want to migrate data (e.g., PST data) related to work email of all employees to the target system (e.g., Microsoft Office 365). As noted above, the data may be migrated in order to provide a backup copy for situations where the data could be lost (e.g., computing device failure) or to provide a centralized location where the PST data can be accessed from. The data may be migrated so that a particular user has access to the same data on two separate devices. In order to extract and store the PST data to the target system, the location where the PST data is stored needs to be identified.

To determine where the identified data to be migrated (e.g., PST data) is stored, the Migration Manager may first scan an Active Directory to identify applicable users. The Active Directory may be a list of users associated with a particular entity that is performing the data migration. For example, a business may have an Active Directory that includes the names of all the employees who work for the business. The Migration Manager can use the Active Directory to identify the employees who are subject to the data migration. If the Migration Manager is instructed to perform migration of data for only a subset of employees (e.g., particular department), the Active Directory can also be used to identify the particular subset of employees. In other embodiments, the Migration Manager may be provided the identities of the employees who the data migration may be performed for. For example, an administrator may indicate that John Doe's PST data should be migrated to the target system.

The Migration Manager also determines where the data for the identified employees is stored. By using the Active Directory to identify the set of applicable employees, the Migration Manager can then identify the various sources where the data to be migrated may be stored. For example, the Migration Manager may look for associated computing devices associated with each employee. These computing devices (e.g., desktop, laptop, mobile device) may be assigned to each employee for work-related functions. The Migration Manager can utilize the network of the business to determine which computing devices are available. Some computing device may be connected directly to the network associated with the business. In situations where an employee is working remotely, the working device may indirectly connect (e.g., Virtual Private Network) to the network associated with the business. In any case, the Migration Manager can search for the corresponding computing devices assigned to each employee so long as the computing device is somehow connected to the same business network. In scenarios where a computing device is known to exist for a particular employee but cannot be found, the Migration Manager may search for the computing device continually or at regular intervals until a period of time has elapsed.

Once the computing device has been located, the Migration Manager can then search the memory of each computing devices for the requested data to be migrated. With respect to the embodiment discussed above, the Migration Manager searches the memory of each computing device for the PST data. In other embodiments, the Migration Manager may also be instructed to look for more than just PST data.

As noted above, individual users may also be capable of indicating to the Migration Manager that the PST data associated with the user source system that the user would like to migrate the PST data to a target system (e.g., a second computing device associated with the user). The user may provide such indication to the Migration Manager through the use of an application or graphical user interface (GUI). Through the use of the application or GUI, the user can provide the identity and location of the stored PST data. In some embodiments, the application or GUI may also allow the user to identify the target system.

The discovery step 210 can be performed for each employee found on the Active Directory for which data migration is scheduled to be performed for. The number of employees in which discovery is performed for may vary based on the need of the business. In fact, the Migration Manager is capable of customization including identifying who the data migration is performed for and what set of data is being migrated. As noted above, the customization may be controlled by an administrator (e.g., an individual associated with the business tasked with managing and operating the Migration Manager).

In other embodiments, the data migration may be scheduled for individual users on an as needed basis. Through the use of an exemplary application or GUI described above, the Migration Manager can conduct data migration for a particular user wishing to migrate PST data from the source system to the target system whenever a request to do so is received by the Migration Manager.

Step 220 involves the Migration Manager providing a transformation that can be used during data migration. Generally, the Migration Manager evaluates the format of the data from the source system and the format requirements for the target system. In some situations, the format for the data stored in the source system and the format requirements for data to be stored in the target system are distinct. Therefore, to complete the data migration, the Migration Manager may need to provide transformations for source data from its original format into a format that is accepted by the target system. This transformation process involves obtaining proprietary information regarding data formats used by the source system and the target system. The information can then be used to provide a mapping or conversions between the two formats. These derived transformations in step 220 are later used during the actual migration of the data in step 230 below. These derived transformations may be stored in memory associated with the Migration Manager for future use with a particular source system-target system pairing.

In step 230, the data migration is performed by the Migration Manager. Generally, the Migration Manager extracts the particular data from the source system. The Migration Manager can first temporarily store the extracted data in memory associated with the Migration Manager. The Migration Manager can then perform any necessary transformations (derived above in step 220) related to the formatting of the extracted data to ensure that the data can be compatible when written into the target system. After the transformation has been performed on the data, the data is written into the target system. The extracted data that was temporarily stored in the Migration Manager can then be deleted to make room for additional data migrations.

In the embodiment described above, the PST data can be migrated from one or more sources to the target system (e.g., another computing device). As indicated above, data migration may be performed for various reasons including backing up the data (e.g., PST data) or providing the user access to the same information albeit with two different devices.

Before data migration can be completed, however, the Migration Manager may need to verify the ownership of the migrated data (e.g., PST data) to ensure that the data is provided to the correct target location. In some embodiments, issues with the ownership of the PST data may not be an issue. For example, if data migration is performed in one period of time where the user identifies the source system, target system and the data to be migrated, the Migration Manager can be sure that the correct data is being migrated to the correct target system.

The ownership of a particular set of PST data, however, may not always be clear or obvious. In some situations, the PST data may be extracted from the source system and stored temporarily at an intermediate storage location (e.g., server, database). Ownership of the PST data may be modified based on who owns the intermediate storage location (e.g., administrator). The intermediate storage location may also have a plurality of other similar data obtained from other users as well. In order to complete the data migration of the previously extracted archived data to the appropriate target system, the Migration Manager would need to determine who previously owned the archived data (e.g., PST data).

Figure 3:
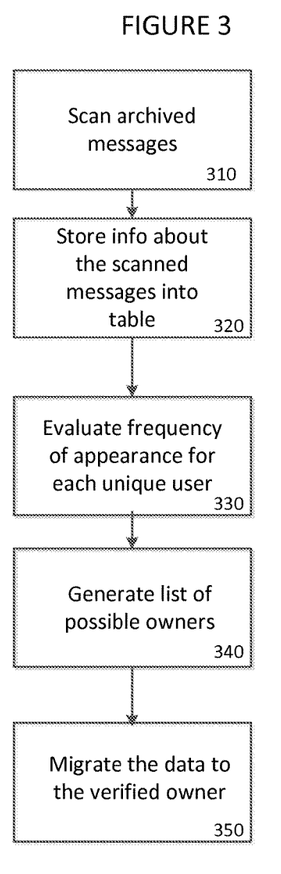
FIG. 3 illustrates a flowchart describing steps performed for determining mail archive ownership.

FIG. 3 illustrates a flowchart describing steps performed for determining mail archive ownership. As noted above, embodiments of the present invention may include determining who owns the archived data (e.g., PST data) in order to ensure that the correct data is being migrated to the correct target system.

In step 310, the Migration Manager scans the archived data (e.g., PST data). In particular, messages associated with the archived data are scanned. The messages may retain their organization based on how they were stored in the source system. For example, messages may be associated with an "Inbox", "Sent folder", "Trash" or any number of customizable folders the user can create. Generally, the Migration Manager will scan the messages stored in the "Sent folder" although other folders may be scanned. The "Sent folder" is significant, because each message would have an identified sender identified in the "from" section of the email. Presumably the user would utilize their mailbox (e.g., thereby have access and authorization) in order to send messages to one or more recipients. By viewing the "from" section, the owner can be inferred since the identified user would need to have access to the mailbox in order to send the email in the first place. There may be situations, however, where multiple users have access to the same mailbox, thereby necessitating the 'confirmation step' described below to validate the target system as being associated with the owner of the archived data. Since most mailboxes are generally owned by a single user, utilizing the "from" section from the "Sent folder" may be a good indicator of ownership of the archived mail.

In another embodiment, messages can also be scanned from the "Inbox." In a similar way where an identity can be obtained from scanning the "from" section for each sent message, each "to" section can be scanned for each received message. The "to" section may be indicative of the intended recipient of message. Unlike the "from" section where messages usually are generated from only one user, emails may be capable of listing multiple users in the "to" section.

By scanning the messages in the various folders, the Migration Manager can obtain the various unique users associated with the messages and the frequency by which one or more users appear in the messages. It can be inferred that the user that appears the most frequently would be the owner of the archived data. The various users may be identified by a corresponding email address. In some embodiments, the email address may be associated with a user name. Each unique user is then stored in a table in step 320. The table may include the number of times that particular user appears during the scanning performed in step 310. The table may also include the total number of messages that were scanned.

In step 330, the Migration Manager can calculate a relative frequency of appearance (or confidence level) for each unique user in the table. Generally, the user that appears the most can be inferred as the owner of the archived mail. The percentages can be calculated by dividing a total number of instances that a particular user appears in the messages over the total number of messages scanned. The total number of appearances and the total number of messages scanned may pertain to one or more folders (e.g., Sent folder). Selection of which folders should be scanned and evaluated can be set by the Migration Manager.

In step 340, the Migration Manager can generate a list of possible owners of the archived data based on the evaluation performed in step 330. The list may include all unique user names with their corresponding confidence level calculated in step 330. In some embodiments, the Migration Manager may only display the user names of possible owners based on a given threshold/confidence level. Exemplary thresholds may include low, medium and high confidence associated with a corresponding percentage. For example, low confidence may be associated with anything between 0-50%. Medium confidence may be associated between 50%-75%. High confidence may be associated with anything greater than 75%. It should be noted that the percentages provided above associated with each confidence level may be adjusted/customizable. Generally, the higher the confidence level, the more likely the corresponding user is the owner.

From the list, the Migration Manager can provide identities of some possible owners to the target source. The Migration Manager may provide the list of possible owners through the use of an application or graphical user interface (GUI). The user associated with the target source may then be instructed by the Migration Manager to confirm whether their name is listed on that list using the same application or GUI. Presumably, the user associated with the target source should be the name that has the highest confidence level if the archived data belongs to the user. Once the user associated with the target source validates that the archived data belongs to the user, the Migration Manager can complete the data migration of the archived data to the target source in step 350.

In situations where the name of the user is not provided on the list, it can be inferred that the archived data does not belong to the user associated with the target source. In this case, the Migration Manager should be instructed not to complete the data migration of the archived data to the target source. With the recently scanned archived data, the Migration Manager may then perform a search for the possible owner of the archived data by providing the list of user names to other target sources where data migration is also occurring. The Migration Manager can also scan and evaluate other archived data to find the data that belongs to the user associated with the target source.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method comprising:
responsive to receiving a migration request to migrate an electronic message archive to a target system, scanning the electronic message archive to identify a sent folder that includes a plurality of archived electronic messages in an electronic data storage;
scanning only the plurality of archived electronic messages in the sent folder to obtain one or more unique user names corresponding to possible owners of the electronic message archive;
storing into memory each unique user name obtained during the scanning of the plurality of archived electronic messages in the sent folder of the electronic message archive;
storing, into a table in the memory, associated data obtained during the scanning of the plurality of archived electronic messages in the sent folder, wherein the table includes a number of times that each unique user name appeared in the scanning;
calculating a relative frequency of appearance of each unique user name in a from section in each of the plurality of archived electronic messages in the sent folder, the frequency of appearance being calculated based on the number of times that each unique user name appeared in the scanning and a total number of scanned sent electronic messages;
calculating a confidence level for each unique user name, wherein the confidence level is calculated based on the associated frequency of appearance of the user in the from section in each of the plurality of archived electronic messages in the sent folder and the total number of scanned electronic messages in the sent folder;
generating a list of possible owners based on the calculated confidence level for each unique user name;
validating that the electronic message archive belongs to a particular user based on the unique user name of the user appearing on the generated list and on a confidence level for the particular user; and
responsive to the validating, migrating the electronic message archive to an electronic storage device of the target system associated with the user.

2. The method of claim 1, wherein the scanning is performed for a select group of electronic messages.

3. The method of claim 1, further comprising providing the generated list of possible owners to the target system so that the user associated with the target system can confirm ownership of the electronic message archive based on the generated list.

4. The method of claim 1, wherein the generated list of possible owners includes unique user names each having a confidence level that at least meets a selected confidence level threshold.

5. The method of claim 4, wherein the selected confidence level is selected from a plurality of confidence level thresholds including low confidence, medium confidence, and high confidence.

6. A system, comprising:
a migration manager, the migration manager including a processor that is configured to execute instructions stored in memory to cause the system to:
scan a plurality of archived messages in an archived sent folder, wherein the archived messages are all associated with the same archived mail data responsive to receiving a migration request to migrate the plurality of archived electronic messages to a target system, and wherein the scanning obtains one or more unique user names corresponding to possible owners of the archived electronic mail data;
store into memory each unique user name obtained during the scanning of the archived electronic messages;
store into a table in the memory associated data obtained during the scanning of the archived electronic messages, wherein the table includes a number of times that each unique user name appeared in the scanning;
calculate a frequency of appearance of each unique user name and a total number of scanned electronic messages, the frequency of appearance being calculated based on the number of times that each unique user name appeared in the scanning;
calculate a confidence level for each unique user name, wherein the confidence level is associated with a group of similar confidence levels, wherein the confidence level is calculated based on the associated frequency of appearance of the user in the from section in each of the plurality of archived electronic messages in the sent folder and the total number of scanned electronic messages in the sent folder;
generate a list of possible owners based on the calculated confidence level for each unique user name;
validate that the archived electronic mail belongs to a particular user based on the unique name of the user appearing on the generated list and on a confidence level for the particular user; and
responsive to the validating, migrate the archived electronic mail to an electronic storage device of the target system associated with the user.

7. The system of claim 6, wherein execution of the instructions further causes the system to scan a select group of electronic messages.

8. The system of claim 6, wherein the generated list of possible owners is provided to the target system so that the user associated with the target system can confirm ownership of the archived electronic mail based on the generated list.

9. The system of claim 6, wherein the generated list of possible owners includes unique user names each having a confidence level that at least meets a selected confidence level threshold.

10. The system of claim 9, wherein the selected confidence level is selected from a plurality of confidence level thresholds including low confidence, medium confidence, and high confidence.

11. A non-transitory computer-readable storage medium, having embodied thereon a program executable by a processor to cause a system to perform operations comprising:
scanning a plurality of archived electronic messages in an archived sent folder of an electronic message archive, wherein the scanning obtains one or more unique user names corresponding to possible owners of the electronic message archive;

storing into memory each unique user name obtained during the scanning of the archived electronic messages in the archived sent folder;

storing, into a table in the memory, associated data obtained during the scanning of the archived electronic messages in the archived sent folder, wherein the table includes a number of times that each unique user name appeared in the scanning;

calculating a frequency of appearance of each unique user name in a from section in each of the plurality of archived electronic messages in the sent folder the frequency of appearance being calculated based on the number of times that each unique user name appeared in the scanning and a total number of scanned electronic messages;

calculating a confidence level for each unique user name, wherein the confidence level is associated with a group of similar confidence levels, wherein the confidence level is based calculated on the associated frequency of appearance of the user in the from section in each of the plurality of archived electronic messages in the sent folder and the total number of scanned electronic messages in the sent folder;

generating a list of possible owners based on the calculated confidence level for each unique user name;

validating that the archived electronic mail belongs to a particular user based on the unique user name of the user appearing on the generated list and on a confidence level for the particular user; and responsive to the validating, migrating the archived electronic mail to an electronic storage device of the target system associated with the user.

\* \* \* \* \*